(12) United States Patent
Seigel

(10) Patent No.: US 9,871,814 B2
(45) Date of Patent: Jan. 16, 2018

(54) SYSTEM AND METHOD FOR IMPROVING SECURITY INTELLIGENCE THROUGH INVENTORY DISCOVERY

(71) Applicant: DELL PRODUCTS L.P., Round Rock, TX (US)

(72) Inventor: Jake Seigel, Halifax (CA)

(73) Assignee: QUEST SOFTWARE INC., Aliso Viejo, CA (US)

(*) Notice: Subject to any disclaimer, the term of this patent is extended or adjusted under 35 U.S.C. 154(b) by 222 days.

(21) Appl. No.: 14/797,010

(22) Filed: Jul. 10, 2015

(65) Prior Publication Data
US 2017/0013007 A1  Jan. 12, 2017

(51) Int. Cl.
H04L 29/06 (2006.01)
H04L 12/24 (2006.01)
H04L 29/08 (2006.01)
G06F 9/445 (2006.01)

(52) U.S. Cl.
CPC ............ *H04L 63/1433* (2013.01); *G06F 8/61* (2013.01); *H04L 41/12* (2013.01); *H04L 67/24* (2013.01)

(58) Field of Classification Search
CPC ..... H04L 63/1433; H04L 67/24; H04L 41/12; G06F 8/61

USPC .......................................................... 726/22
See application file for complete search history.

(56) References Cited

U.S. PATENT DOCUMENTS

2007/0136814 A1* 6/2007 Lee ...................... G06F 21/552
726/25
2014/0130176 A1* 5/2014 Fang ...................... G06F 21/10
726/26

* cited by examiner

*Primary Examiner* — Baotran N To
(74) *Attorney, Agent, or Firm* — Maschoff Brennan

(57) ABSTRACT

A system for monitoring devices in a network comprising a coordinator operating on a first processor and configured to detect a plurality of active devices and to install an audit agent on each of the plurality of active devices. The audit agents configured to obtain configuration data for the active device that they are installed on using a processor of the active device, and to obtain configuration for each of a plurality of passive devices that the active device can access, where the passive devices are unable to support installation of an audit agent, and to transmit the configuration data to the coordinator. The coordinator configured to receive the configuration data for the active device and for the passive devices and to store the configuration data in a format that allows the configuration data to be selectively retrieved for the active device and the passive devices.

19 Claims, 3 Drawing Sheets

SYSTEM AND METHOD FOR IMPROVING SECURITY INTELLIGENCE THROUGH INVENTORY DISCOVERY

TECHNICAL FIELD

The present disclosure relates generally to network management, and more specifically to a system and method for improving security intelligence through inventory discovery.

BACKGROUND OF THE INVENTION

Networks are collections of devices that operate together. Because users can add devices to the network and software to the devices, the configuration of the network is often difficult for an operator to determine.

SUMMARY OF THE INVENTION

A system for monitoring devices in a network is disclosed that includes a coordinator operating on a first processor that is configured to detect workstations and servers and to install an audit agent on each of the workstations and servers. The audit agents are configured to obtain configuration data for the workstations and servers that they are installed on using a processor of the workstation or server, and to obtain configuration data for each of a plurality of passive devices that the workstations and servers can access, such as external hard drives, printers, photocopiers or other devices that are unable to support installation of an audit agent, and to transmit the configuration data to the coordinator. The coordinator receives the configuration data for the workstations, servers and passive devices and stores the configuration data in a format that allows the configuration data to be selectively retrieved for the workstations, servers and passive devices.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
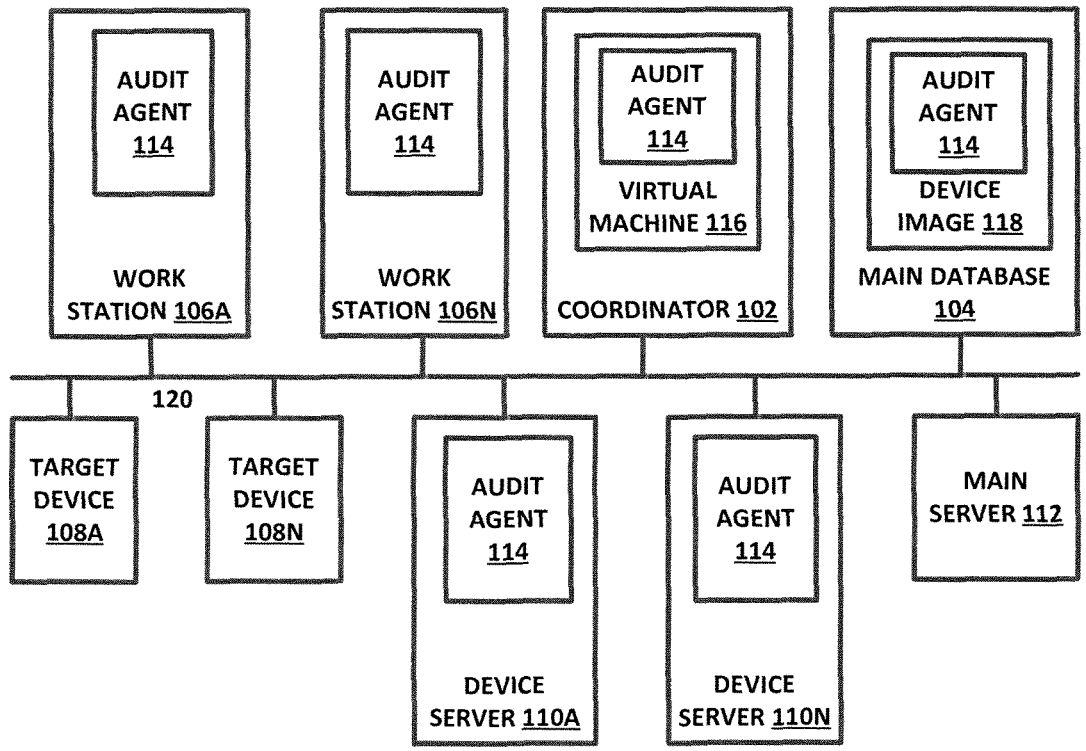
FIG. 1 is a diagram of a system for discovery of active and passive network devices, in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

The present disclosure pertains to the use-case of remote inventory agents, which can be utilized when a software agent cannot be installed onto a target device, but where data that defines the configuration and operation of the remote device can still be extracted from it. An example of this application is a network-attached storage device, or other suitable passive network devices that do not contain an operating system. An agent that does not reside on the network-attached storage device can collect information about the network-attached storage device through a suitable interface. The inventory discovery system and process of the present disclosure is configured to operate in conjunction with this set-up to provide full inventory discovery and control functional features, such as to monitor changes to the network-attached storage device, software or files that are stored on the network-attached storage device, applications that utilize the network-attached storage device and other suitable functions.

One aspect of the inventory discovery system and process of the present disclosure is the ability to perform auditing and protection of such passive network devices. An agent performing automatic auditing processing of a passive network device is configured to send data that defines the configuration and operation of a software component to a data store, and can further audit the interaction of other systems, devices and components with the software component and interactions of the software component with other software components. These interactions may not directly impact the software component itself in some cases, but can affect other software components.

In addition, protection of these detected components is also provided. An important aspect and use-case of the inventory discovery disclosure is the ability to protect detected components. In general, protection consists of a process to actively deny further access and/or modification to the target component.

The present disclosure utilizes virtual machines that are implemented using non-permanent deployment on devices, where the agent is deployed to a system image (and therefore a device), but it is seamlessly, and sometimes frequently moved to reside on a completely separate device, while maintaining its core structure and identity. This is an important use-case of the inventory discovery disclosure, given the advent of virtualized hardware. An agent for virtualized hardware can be relocated to the server or other system that is emulating the device.

Another aspect of the present inventory discovery disclosure provides security intelligence to an administrator user. By determining domains that have a high number of detected rogue installations, a risk value can be applied that informs the administrator about the security issues and concerns associated with those domains. This functionality provides the utility of detecting rogue elements and environments within the area of coverage by the system.

In one exemplary embodiment, the present disclosure utilizes a change auditor system that can be deployed on a plurality of servers and which can collect activity data for security and compliance auditing. While the present disclosure is described in the context of the change auditor system, other suitable systems and architectures can also or alternatively be used.

FIG. 1 is a diagram of a system 100 for discovery of active and passive network devices, in accordance with an exemplary embodiment of the present disclosure. System 100 includes a network environment where a distributed system 100 operates on hardware and software embodiments of active and passive devices, including coordinator 102, main database 104, work stations 106A through 106N, target devices 108A through 108N, device servers 110A through 110N, main server 112, audit agents 114, virtual machine 116, device image 118 and network 120, each of which can be implemented in hardware or a suitable combination of hardware and software.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

In one exemplary embodiment, coordinator 102 can be a server or system operating on a server that is configured to interact with main database 104, work stations 106A through 106N, target devices 108A through 108N, device servers 110A through 110N, main server 112, audit agents 114, virtual machine 116 and device image 118 over network 120, such as to discover database 104, work stations 106A through 106N, target devices 108A through 108N, device servers 110A through 110N, main server 112, to install audit agents 114 on the discovered devices, to generate inventory data, to perform audits and to perform other suitable functions.

Main database 104 can be used to store data discovered by coordinator 102, such as inventory data, audit data, network topology data and other suitable data. Likewise, main database 104 can also be a database that is used to store one or more device images 118, where each of the device images 118 can be instantiated using main database 104, and where device image 118 has an associated audit agent 114. In this manner, audit agent 114 can be implemented in conjunction with a device image 118 and not just an active device that has an operating system and other active components.

Work stations 106A through 106N can be individual computer workstations such as desktop computers, notebook computers or other suitable devices that are typically assigned to individual users, and each can have an associated audit agent 114 that is installed by coordinator 102 when each work station is discovered or at other suitable times. The audit agent 114 can directly monitor and audit the associated work station and report data to coordinator 102.

Target devices 108A through 108N can be passive devices such as external disc drives, printers, copy machines, telephones, fax machines or other devices that do not have operating systems or capability to install an audit agent 114. Instead, target devices 108A through 108N can be discovered by coordinator 102 either directly or by audit agents 114 on workstations 106A through 106N, device servers 110A through 110N, virtual machines 116, device images 118 or other suitable audit agents, such as when target devices 108A through 108N are accessed by those devices or software systems that operate on or in conjunction with those devices.

Device servers 110A through 110N can be individual computer servers such as file servers, mail servers, application servers or other suitable servers that are typically assigned to groups of devices, and each can have an associated audit agent 114 that is installed by coordinator 102 when each server is discovered. The audit agent 114 can directly monitor and audit the associated server and report data to coordinator 102.

Main server 112 can be used to host coordinator 102 or to perform other suitable functions. In one exemplary embodiment, main server 112 can be a plurality of distributed servers such as session servers or other servers that are used to control access to system 100.

Audit agents 114 can be deployed on workstations 106A through 106N, device servers 110A through 110N, virtual machines 116, device images 118 or other suitable devices, such as by coordinator 102, during a discovery process or in other suitable manners. Audit agents can implement a number of algorithms to discover software applications, passive devices and other suitable hardware and systems. In one exemplary embodiment, software applications discovered by an audit agent 114 that are identified to coordinator 102 can be configured by coordinator 102 to prevent updates from being implemented by a third party, such as by using an authorization setting of the software application to require authorization for updates from an operator or other suitable individual.

Virtual machine 116 can be used to host audit agents 114, to provide a device image or to perform other suitable functions. In one exemplary embodiment, virtual machine 116 can be used to perform device discovery using audit agent 114, where virtual machine 116 is moved to multiple servers as part of the discovery process.

Device image 118 can be used to emulate a device, such as to allow a user to access functionality on system 100 through a device that has limited and controlled access to system functionality. In one exemplary embodiment, device image 118 can be implemented as one or more virtual machines operating on one or more servers, where the virtual machine has associated data storage allocated in memory, associated software applications and other associated hardware and software resources. For example, a user can be allowed to access system 100 over a public Internet connection using Citrix or other suitable systems that emulate a workstation for the user. In this exemplary embodiment, an audit agent 114 can be associated with a device image 118 in the same manner as an audit agent is associated with a physical device, wherein coordinator 102 is configured to track the functions of the audit agent 114 associated with a device image when the virtual machine associated with the device image is instantiated, such as to download updated databases, directories, registries, service lists or other suitable data to the audit agent 114 associated with the device image, where the audit agent 114 is configured to perform a periodic audit of the device image, where the audit agent 114 is configured to prevent the configuration of predetermined software applications or components of the device image from being modified, or to perform other suitable functions.

Network 120 can be a wireline network, a wireless network, an optical network, other suitable networks or a combination of networks that are used to allow coordinator 102, main database 104, work stations 106A through 106N, target devices 108A through 108N, device servers 110A through 110N, main server 112, audit agents 114, virtual machine 116 and device image 118 to interconnect and transfer data.

Coordinator 102 is configured to manage the activities of other components, such as by implementing one or more of the algorithms described in greater detail herein. Coordinator 102 can also utilize a database such as main database 104 or other suitable databases to store and retrieve activity data, discovery data and other suitable data for active and passive devices. In addition to storing and retrieving the data, coordinator 102 is also configured to deploy audit agents 114 out to other servers on the network, such as device servers 110A through 110N, main server 112 and other suitable servers. These servers can be detected by coordinator 102 by scanning a directory management system such as Active Directory in accordance with a scanning algorithm, and then building a topology of the network using a topology building algorithm.

Coordinator 102 can be configured to deploy audit agents 114 to any suitable machine that it detects using the scanning algorithm or other suitable algorithms, which can include device servers 110A through 110N, workstations 106A through 106N or other suitable devices. In one exemplary embodiment, coordinator 102 can generate a list of audit agents and associated device identifiers that each audit agent is installed on, and can then copy the audit agent to a directory of the device and associated commands to a suitable location of the audit device, such as a configuration command file. Once an audit agent 114 is deployed to a device, the audit agent 114 performs a scan of the device. Using a predetermined heuristic, audit agent 114 can detect software applications that should be protected and audited (including but not limited to rogue SQL servers, sensitively classified documents, Exchange servers), can alert an administrator as to the existence of the software applications and can perform other suitable functions. The algorithm implemented to perform the scan can be a function of the type of heuristics being utilized, such as checking an operating system registry for known entries, scanning a file system to detect known installation structures, or other suitable algorithms.

After audit agents 114 have collected data that identifies target devices and that provides registry data, installation structures and other suitable data, audit agents 114 send the data to coordinator 102 for storage and analysis. In one exemplary embodiment, coordinator 102 can generate one or more user controls to allow an administrator user to generate and review user-configurable reports that present details on the detected software applications, to implement security processes and to perform other suitable functions. Audit agents 114 can be configured to execute one or more algorithms that automatically audit software applications and components on the target devices, to provide automatic and customized coverage without human input.

In one exemplary embodiment, the algorithms used to discover devices and software applications can look at known install directories for products, such as by storing a small database of known software that is of interest on each audit agent 114 that is doing the scanning. Within these directories, primary executable files for the known software applications should be found if it is present, and its existence in such locations is an indicator of a valid installation. For example, Microsoft SQL Server's (2008) primary executable is typically located in the following directory by default: C:\Program Files\Microsoft SQL Server\ MSSQL10_50.MSSQLSERVER\MSSQL\Binn. Likewise, other suitable directories, software applications and software components can be identified in the database.

In another exemplary embodiment, a full file system scan can be performed to look for known primary executable files and installation directories for software applications and components, such as to locate software where a user has opted out of a default installation location and has selected a custom directory.

In yet another exemplary embodiment, installed software applications and components frequently make use of the Windows registry for the storage of settings. Unlike installation paths, the user has no control over where an installer puts settings in the registry. For example, in addition to version-specific registry keys, all versions of MS SQL Server have the following registry keys:

HKEY_LOCAL_MACHINE\SYSTEM\
   CurrentControlSet\Services\M SSQLServer
HKEY_LOCAL_MACHINE\SOFTWARE\
   Microsoft\MSSQLServer The agent can also look at currently running processes, which are good indicators of live and properly operating software applications and components running on a machine. For example, if MS SQL Server is running on a computer, there will be a handful of processes likely running, where the primary one is "sqlservr.exe".

In another exemplary embodiment, registered services that are operating on the computer can also be identified. These registered services are long-running executable applications, such as ones that are started when Windows boots up. MS SQL Server has several services that are installed by default and additional ones that are optional. For example, one of the default services for MS SQL Server is "SQLSERVERAGENT", and it starts when the operating system boots.

Figure 2:
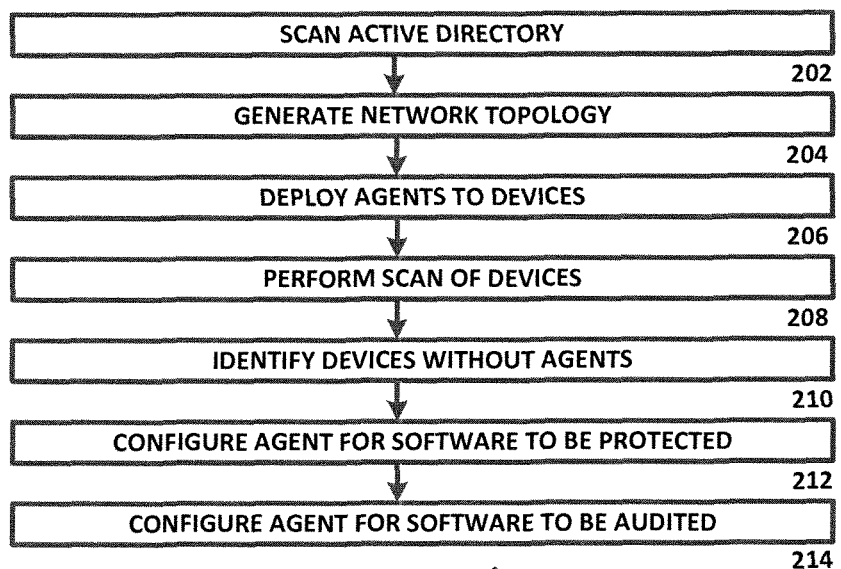
FIG. 2 is a diagram of an algorithm for discovery of active and passive network devices, in accordance with an exemplary embodiment of the present disclosure.

FIG. 2 is a diagram of an algorithm 200 for discovery of active and passive network devices, in accordance with an exemplary embodiment of the present disclosure. Algorithm 200 can be implemented in hardware or a suitable combination of hardware and software.

Algorithm 200 begins at 202, where an active directory is scanned. In one exemplary embodiment, a domain controller can be used to authenticate and authorize users and devices, to enforce security policies for all devices, to install or update software applications and components or to perform other suitable processes, which can be referred to as an active directory. The active directory can thus include data that identifies software applications and components that have been installed and maintained on a device. A number of suitable algorithms that can be used as part of an active directory are the Lightweight Directory Access Protocol, Kerberos or other suitable protocols or algorithms. The algorithm then proceeds to 204.

At 204, a network topology is generated. In one exemplary embodiment, processes and protocols such as ping, traceroute, simple network management protocol (SNMP), domain name servers (DNS), network interface controller (NIC) data and other suitable processes and protocols can be used to determine the network topology. The algorithm then proceeds to 206.

At 206, audit agents are deployed to devices. In one exemplary embodiment, the audit agent for a device can be selected as function of the device type, the operating system or other suitable parameters. The algorithm then proceeds to 208.

At 208, a scan is performed of devices, such as by using a scanning algorithm that reads each sector of a data storage device or in other suitable manners. The algorithm then proceeds to 210.

At 210, devices without agents are identified. In one exemplary embodiment, passive devices such as external data storage devices, printers, scanners, copiers, cameras, microphones or other suitable devices that are unable to host an audit agent can be detected and identified, such as where the device network address and other suitable data is stored. The algorithm then proceeds to 212.

At 212, the audit agent is configured for software applications and components to be protected. In one exemplary embodiment, the audit agent can be configured to protect software applications and components by monitoring the software applications and components for changes, by using a configuration control of the software application to require password authorization from a network operator to implement a configuration change to the software application or component or to update the software application or component, or by other suitable algorithms. The algorithm then proceeds to 214.

At 214, the agent is configured for software applications or components that are to be audited. In one exemplary embodiment, the audit agent can be configured to audit software applications or components by periodically transmitting status data defining the software applications or components to a central monitoring system, by interfacing with predetermined program files or by other suitable algorithms. The algorithm then terminates.

Although algorithm 200 is shown as a flow chart, object oriented programming, state diagrams, tree diagrams or other suitable programming paradigms can also or alternatively be used.

Figure 3:
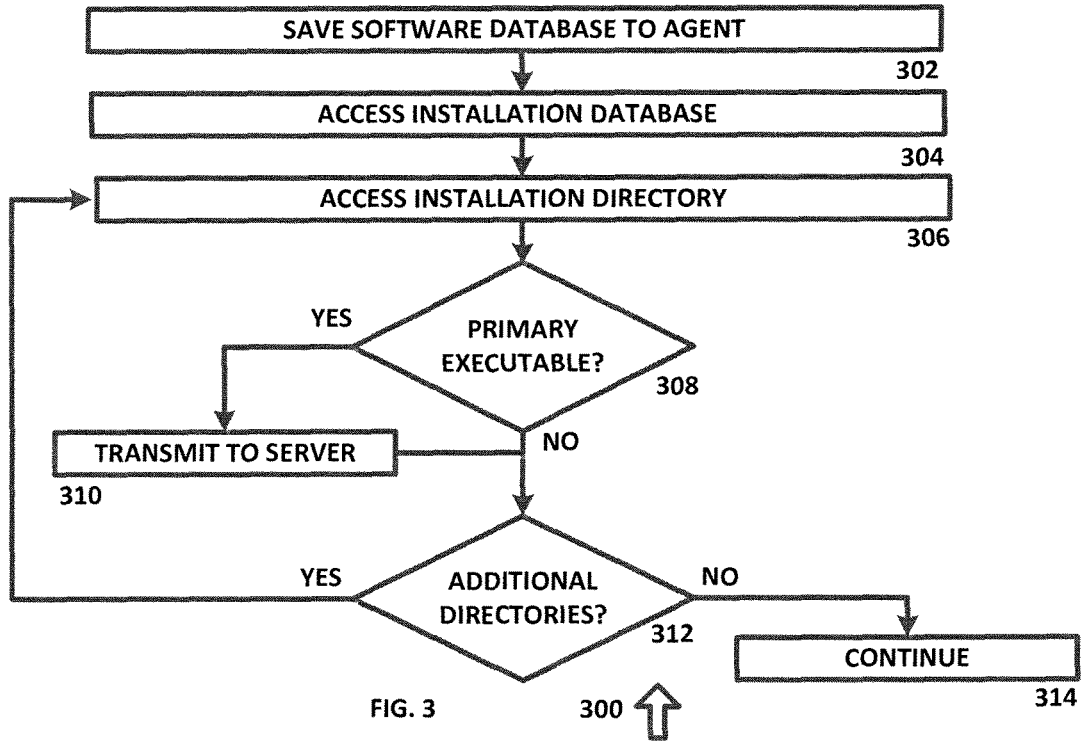
FIG. 3 is a diagram of an algorithm for saving a software database to an audit agent associated with an active or passive device, in accordance with an exemplary embodiment of the present disclosure.

FIG. 3 is a diagram of an algorithm 300 for saving a software database to an audit agent associated with an active or passive device, in accordance with an exemplary embodiment of the present disclosure. Algorithm 300 can be implemented in hardware or a suitable combination of hardware and software.

Algorithm 300 begins at 302, where a software database is saved to an audit agent. In one exemplary embodiment, the software database can be a new software database, a software database that is periodically updated, or other suitable databases. The software database can be selected as a function of a type of device that the audit agent is being used with, when the audit agent is being used with an active device, as a function of the type of device that is accessed by the device that the audit agent is being used with, such as when the audit agent is installed on an active device and is used to monitor and audit a passive device, an audit software database can be obtained from coordinator 102 or other suitable sources, or other suitable software databases can also or alternatively be used. The algorithm then proceeds to 304.

At 304, an installation database is accessed. In one exemplary embodiment, the installation database can include one or more files or data structures that are provided during installation of a software application or component, or other suitable installation databases. The algorithm then proceeds to 306.

At 306, an installation directory is accessed. In one exemplary embodiment, the installation directory can include one or more files or directory structures that are provided during installation of a software application or component, or other suitable installation databases. The algorithm then proceeds to 308.

At 308, it is determined whether a primary executable has been identified. In one exemplary embodiment, a primary executable file can be stored in a predetermined installation directory or other suitable locations that are associated with the installation database or installation directory. If a primary executable has not been identified, the algorithm proceeds to 312, otherwise the algorithm proceeds to 310, where the identification of the primary executable is transmitted to a coordination server, such as coordinator 102, which can then store the identification of the primary executable in a table associated with the device that is being analyzed or in other suitable data structures, and the algorithm then proceeds to 312.

At 312, it is determined whether additional directories are present. If additional directories are not present, the algorithm proceeds to 314 and continues from where the algorithm was called, otherwise the algorithm returns to 306.

Although algorithm 300 is shown as a flow chart, object oriented programming, state diagrams, tree diagrams or other suitable programming paradigms can also or alternatively be used.

Figure 4:
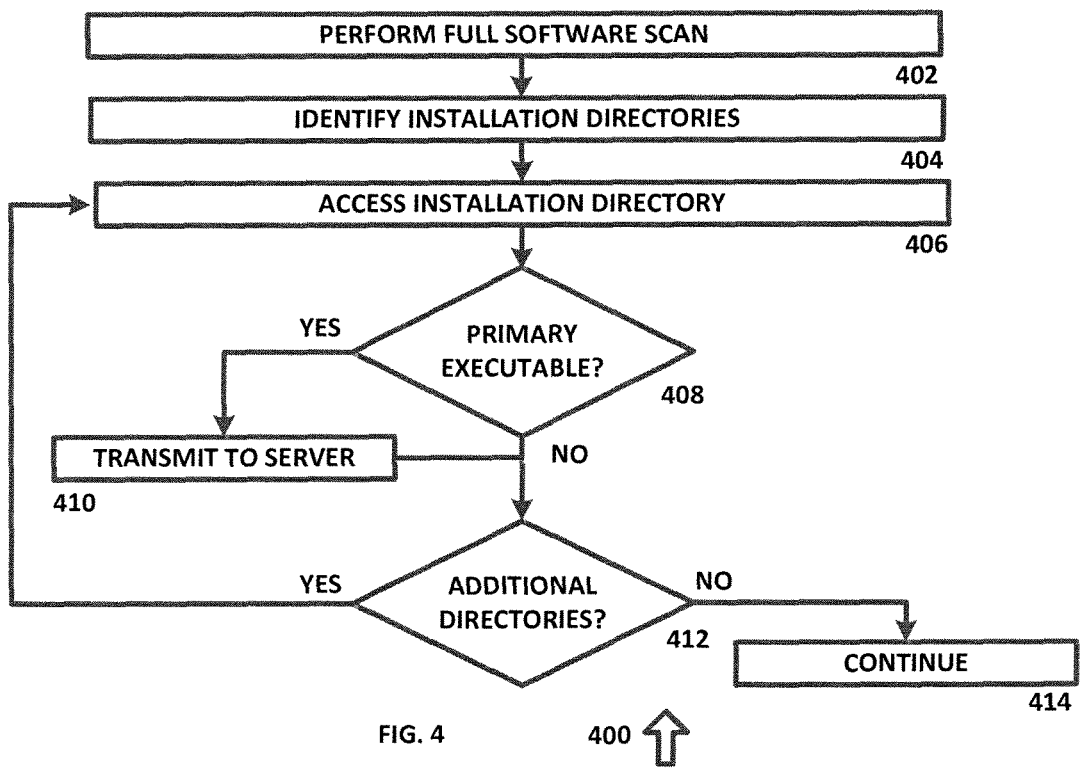
FIG. 4 is a diagram of an algorithm for performing a software scan to identify primary executable files in active or passive devices, in accordance with an exemplary embodiment of the present disclosure.

FIG. 4 is a diagram of an algorithm 400 for performing a software scan to identify primary executable files in active or passive devices, in accordance with an exemplary embodiment of the present disclosure. Algorithm 400 can be implemented in hardware or a suitable combination of hardware and software.

Algorithm 400 begins at 402, where a full software scan is performed for a device. In one exemplary embodiment, a data storage medium of an active or passive device, such as a hard drive, a solid state drive or other suitable devices can be scanned to identify software applications, software components, data structures that are stored on the data storage medium, or other suitable processes can also or alternatively be used. The algorithm then proceeds to 404.

At 404, installation directories are identified. In one exemplary embodiment, installation directories can be identified using predetermined directory identifiers, by comparing the directory identifiers to a database of directory identifiers, installation directories for an audit can be obtained from coordinator 102 or other suitable sources, or installation directories can be identified in other suitable manners. The algorithm then proceeds to 406.

At 406, installation directories are accessed. In one exemplary embodiment, the audit agent can navigate to the installation directories and can obtain a file list of the files contained in the installation directory, or can perform other suitable functions. The algorithm then proceeds to 408.

At 408, it is determined whether a primary executable has been identified, such as by comparing file extensions to known primary executable file extensions, by querying a database of primary executable file names or in other suitable manners. If a primary executable has not been identified, the algorithm proceeds to 412, otherwise the algorithm proceeds to 410, where the identification of the primary executable is transmitted to a server, such as coordinator 102, which can then store the identification of the primary executable in a table associated with the device that is being analyzed or in other suitable data structures, and the algorithm then proceeds to 412.

At 412, it is determined whether additional directories are present. If additional directories are not present, the algorithm proceeds to 414 and continues from where the algorithm was called, otherwise the algorithm returns to 406.

Although algorithm 400 is shown as a flow chart, object oriented programming, state diagrams, tree diagrams or other suitable programming paradigms can also or alternatively be used.

Figure 5:
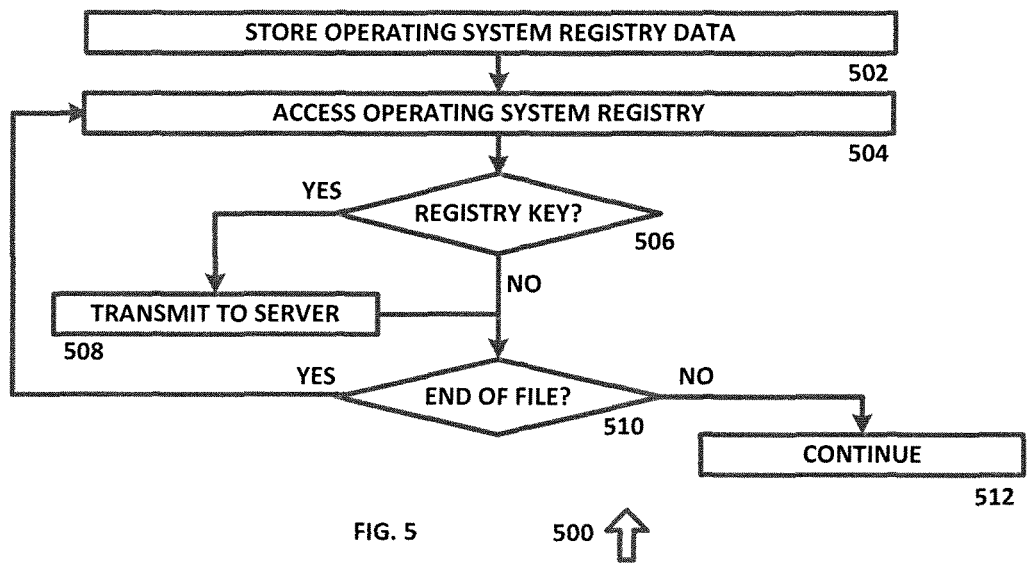
FIG. 5 is a diagram of an algorithm for performing a registry scan to identify registry keys of active or passive devices, in accordance with an exemplary embodiment of the present disclosure.

FIG. 5 is a diagram of an algorithm 500 for performing a registry scan to identify registry keys of active or passive devices, in accordance with an exemplary embodiment of the present disclosure. Algorithm 500 can be implemented in hardware or a suitable combination of hardware and software.

Algorithm 500 begins at 502, where operating system registry data is stored in an audit agent. The operating system registry data can be selected for a registry of an active device for registry data associated with that active device, for registry data associated with a passive device that is accessed by an active device, registry data for an audit can be obtained from coordinator 102 or other suitable sources, or other suitable operating system registry data can be used. The algorithm then proceeds to 504.

At 504, operating system registry data is accessed, such as by accessing a data file or other data structures that include operating system registry data. In one exemplary embodiment, the operating system registry data can be stored in a predetermined location of an operating system directory for an active device, in a predetermined data structure of a passive device or in other suitable locations. The algorithm then proceeds to 506.

At 506, it is determined whether a registry key has been identified. If a registry key has not been identified, the algorithm proceeds to 510, otherwise the algorithm proceeds to 508, where the registry key is transmitted to a server, such as coordinator 102, which can then store the registry key in a table associated with the device that is being analyzed or in other suitable data structures, and the algorithm then proceeds to 510.

At 510, it is determined whether an end of file has been reached. If an end of file has been reached, the algorithm proceeds to 512 and continues from where the algorithm was called, otherwise the algorithm returns to 504.

Although algorithm 500 is shown as a flow chart, object oriented programming, state diagrams, tree diagrams or other suitable programming paradigms can also or alternatively be used.

Figure 6:
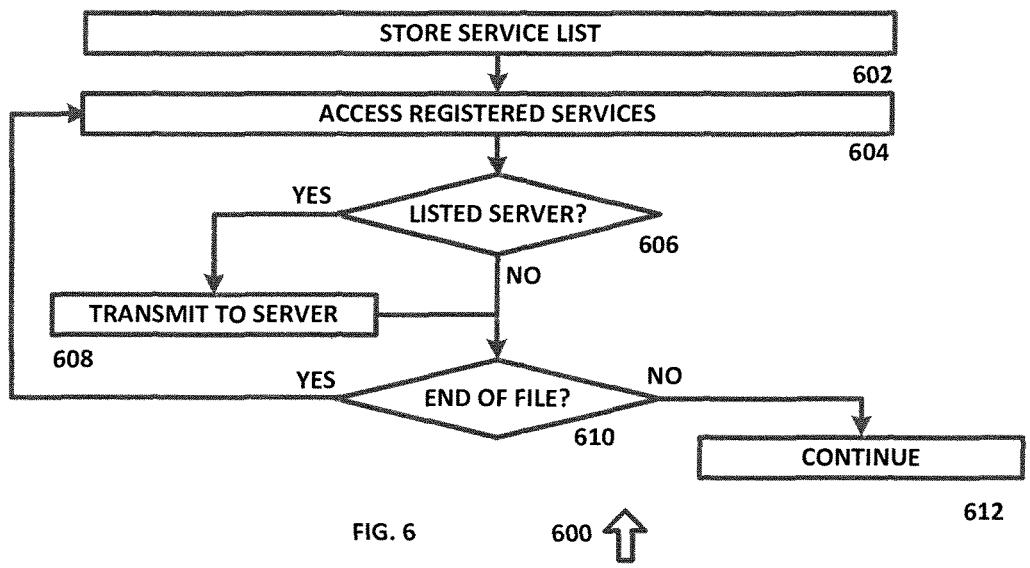
FIG. 6 is a diagram of an algorithm for performing a service scan to identify registered services for active or passive devices in accordance with an exemplary embodiment of the present disclosure.

FIG. 6 is a diagram of an algorithm 600 for performing a service scan to identify registered services for active or passive devices in accordance with an exemplary embodiment of the present disclosure. Algorithm 600 can be implemented in hardware or a suitable combination of hardware and software.

Algorithm 600 begins at 602, where a service list is stored in an audit agent. In one exemplary embodiment, the service list can be stored based on the type of active or passive device that is being monitored by the audit agent, a general service list can be used, an audit service list can be obtained from coordinator 102 or other suitable sources, or other suitable service lists can also or alternatively be used. The algorithm then proceeds to 604.

At 604, registered services are accessed, such as by accessing a predetermined file, directory or other suitable data structure of the device that the audit agent is operating on. The algorithm then proceeds to 606.

At 606, it is determined whether a listed service has been identified. If a listed service has not been identified, the algorithm proceeds to 610, otherwise the algorithm proceeds to 608, where the listed service is transmitted to a server, such as coordinator 102, which can then store the listed service in a table associated with the device that is being analyzed or in other suitable data structures, and the algorithm then proceeds to 610.

At 610, it is determined whether an end of file has been reached. If an end of file has been reached, the algorithm proceeds to 612 and continues from where the algorithm was called, otherwise the algorithm returns to 604.

Although algorithm 600 is shown as a flow chart, object oriented programming, state diagrams, tree diagrams or other suitable programming paradigms can also or alternatively be used.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system to monitor devices in a network, the system comprising:
a coordinator server device that is configured to detect a plurality of active devices and to cause an installation of an audit agent on each of the plurality of active devices,
wherein each of the plurality of active devices includes a respective processor configured to execute a respective audit agent to perform operations comprising:
obtain first configuration data for the respective active device that the audit agent is installed on using a processor of the respective active device,
obtain second configuration data for each of a plurality of passive devices that the respective active device can access, wherein the passive devices are characterized as being unable to support installation of the audit agent; and
transmit the first configuration data and the second configuration data to the coordinator server device,
wherein the coordinator server device is configured to receive the first configuration data for the plurality of active devices and the second configuration data for the passive devices and to store the first configuration data and the second configuration data in a format that allows the first configuration data and the second configuration data to be selectively retrieved for the plurality of active devices and the passive devices.

2. The system of claim 1 wherein the coordinator server device is configured to store a software database in the audit agents as a function of the respective active device associated with each respective audit agent.

3. The system of claim 1 wherein the coordinator server device is configured to store registry data in the respective audit agent as a function of the respective active device associated with each respective audit agent.

4. The system of claim 1 wherein the coordinator server device is configured to store service data in the respective audit agents as a function of the respective active device associated with each respective audit agent.

5. The system of claim 1 wherein the coordinator server device is configured to install an audit agent in a device image, wherein the device image comprises one or more relocatable processes configured to operate on a server.

6. The system of claim 1 wherein the coordinator server device is configured to cause an installation of an audit agent in a virtual machine.

7. The system of claim 1 wherein the coordinator server device is configured to modify a parameter of a software application operating on one or more of the active devices.

8. The system of claim 1 wherein the coordinator server device is configured to modify an update parameter of a software application operating on one or more of the active devices to request authorization from an operator device prior to installing an update.

9. The system of claim 1 wherein the coordinator server device is configured to modify one or more operating functions of the audit agents.

10. A method to monitor devices in a network, the method comprising:
    detecting a plurality of active devices using a first processor of a coordinator server device;
    causing an installation of an audit agent on each of the plurality of active devices using the first processor;
    obtaining first configuration data from each audit agent for the active device that each audit agent is installed on;
    obtaining second configuration data for each of a plurality of passive devices that each active device can access, wherein the passive devices are characterized as being unable to support installation of the audit agent;
    receiving the first configuration data for the active devices and the second configuration data for the passive devices at the coordinator server device; and
    storing the first configuration data for the active devices and the second configuration data for the passive devices in a data storage device in a format accessible by the coordinator server device that allows the first configuration data for the active devices and the second configuration data for the passive devices to be selectively retrieved for the active devices and the passive devices.

11. The method of claim 10 further comprising storing a software database in one or more of the audit agents as a function of the active device associated with each audit agent.

12. The method of claim 10 further comprising storing registry data in one or more of the audit agents as a function of the active device associated with each audit agent.

13. The method of claim 10 further comprising storing service data in one or more of the audit agents as a function of the active device associated with each audit agent.

14. The method of claim 10 further comprising installing an audit agent in a device image, wherein the device image comprises one or more relocatable processes configured to operate on a server.

15. The method of claim 10 further comprising installing an audit agent in a virtual machine.

16. The method of claim 10 further comprising modifying a parameter of a software application configured to operate on one or more of the active devices.

17. The method of claim 10 further comprising modifying an update parameter of a software application configured to operate on one or more of the active devices to request authorization from an operator prior to installing an update.

18. The method of claim 10 further comprising modifying one or more operating functions of the audit agents.

19. The method of claim 10 wherein the first and second configuration data is periodically transmitted from one or more of the audit agents to the coordinator server device.

* * * * *